F. A. TURNER.
CLUTCH.
APPLICATION FILED FEB. 6, 1920.

1,405,698.

Patented Feb. 7, 1922.
2 SHEETS—SHEET 1.

Inventor
FRANK A TURNER

Attys.

F. A. TURNER.
CLUTCH.
APPLICATION FILED FEB. 6, 1920.
1,405,698. Patented Feb. 7, 1922.
2 SHEETS—SHEET 2.
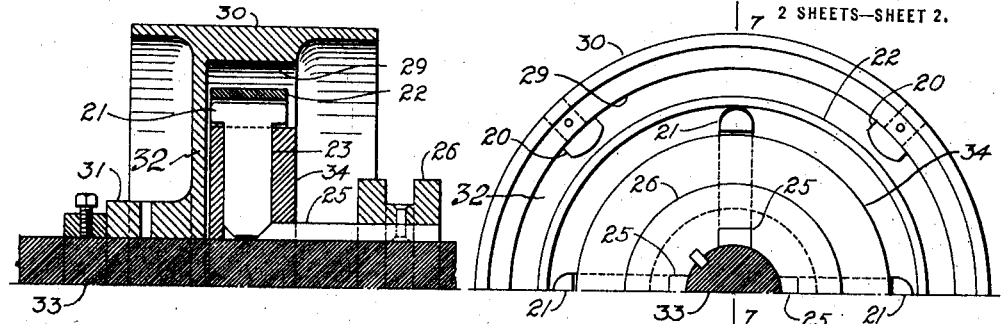
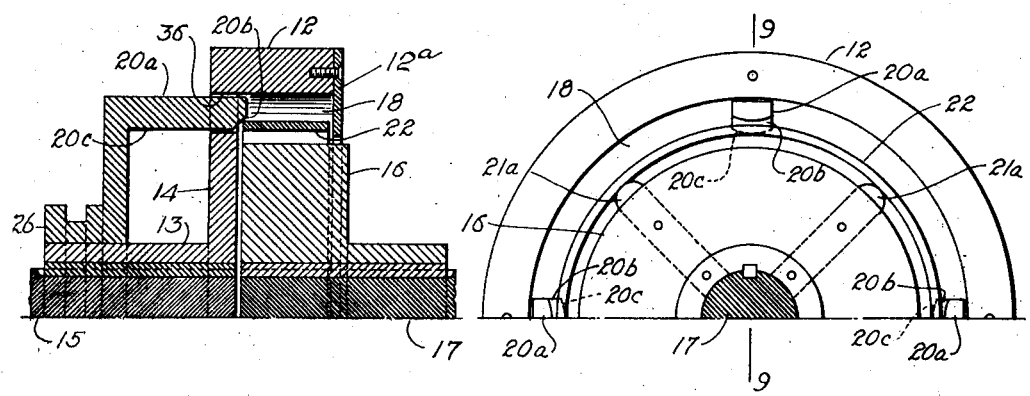
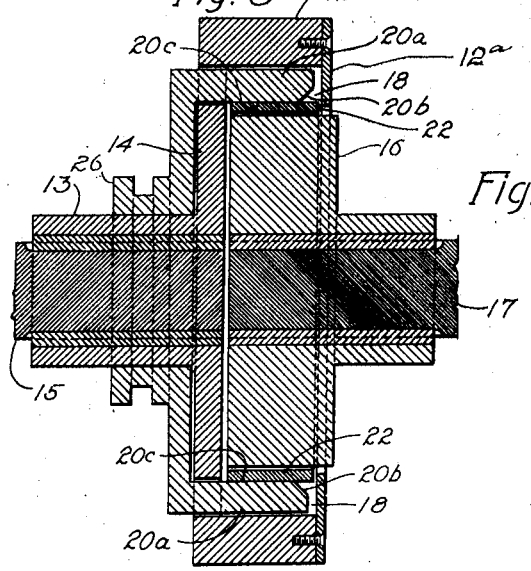
Inventor:
FRANK A TURNER
Attys.

UNITED STATES PATENT OFFICE.

FRANK A. TURNER, OF BOSTON, MASSACHUSETTS.

CLUTCH.

1,405,698. Specification of Letters Patent. Patented Feb. 7, 1922.

Application filed February 6, 1920. Serial No. 356,638.

*To all whom it may concern:*

Be it known that I, FRANK A. TURNER, a citizen of the United States, residing at Boston, in the county of Suffolk and State of Massachusetts, have invented new and useful Improvements in Clutches, of which the following is a specification.

This invention relates to a clutch comprising a driving body member, a driven body member, and torque-transmitting means between said members, permitting the driving member to rotate while the driven member is at rest, and operable to cause the driven member to rotate with the driving member.

The invention has for its object to provide a clutch of this character having torque-transmitting means adapted to connect the two body members positively, but gradually, to enable the driving member to pick up the driven member without an objectionable shock or abruptly applied strain.

The invention is embodied in the improvements which I will now proceed to describe and claim.

Of the accompanying drawings forming a part of the specification,—

Figure 6 is a view similar to Figure 1, showing another embodiment of the invention.

Figure 7 is a section on line 7—7 of Figure 6.

Figure 8 is a view similar to Figure 1, showing a third embodiment of the invention.

Figure 9 is a section on line 9—9 of Figure 8.

Figure 10 is a view similar to a portion of Figure 9, showing a different adjustment.

The same reference characters indicate the same parts in all of the figures.

In the embodiment of the invention shown by Figures 1 to 5, the clutch includes an outer body member comprising an annular rim 12, a hub 13, and a web 14 connecting the hub 13 with the rim 12. The hub is splined or otherwise rigidly secured to a shaft 15, and the rim 12 is concentric with said shaft.

Figure 5:
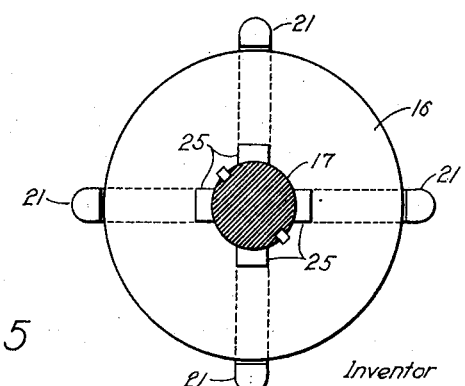
Figure 5 is a section on line 5—5 of Figure 2, and a side view of the inner body member, the outer body member being omitted.

The clutch also includes an inner body member 16, preferably of annular form, as shown by Figure 5, and splined or otherwise rigidly secured to a shaft 17, in alinement with the shaft 15. The body members are coaxial, and the periphery of the inner member is separated from the wall portion 12 of the outer member by an annular space 18 which is concentric with the common axis of the two members. Either of the body members may be the driving member of the clutch.

I have provided gradually acting means for connecting the members to cause the transmission of torque from one member to the other, said means being adapted to cause the driving member to first act yieldingly and then positively on the driven member, so that the driven member is picked up gradually by the driving member, no shock or jar being experienced when the connection between the members becomes positive.

There are three essential elements of said means, namely, first, a circular series of positive transmitting members 20, engaged with the outer body member and projecting inwardly into the space 18; secondly, a circular series of positive transmitting members 21, engaged with the inner body member and projecting outwardly into said space; and thirdly, an annular transmitting member 22, which is alternately resilient and positive in its action, interposed between the positive members 20 and 21. The members 20 face the outer surface, and the numbers 21 face the inner surface, of the member 22.

The annular member 22 is a ring of resilient and practically inextensible material, such as a single strip of spring tempered steel, united at its ends, or a plurality of thinner strips or layers, united at their ends and assembled to form a laminated ring, which, in either case, is adapted to be flexed or distorted as hereinafter described, and to normally assume a circular form.

The positive members forming one series are rigidly attached to the body member with which they are engaged, and are radially immovable. The positive members forming the other series are radially movable on the body member with which they are engaged. As here shown, the positive members 20 are radially immovable and are fixed to the outer body member, while the positive members 21 are radially movable in guides 23 formed in the inner body member.

Figure 2:
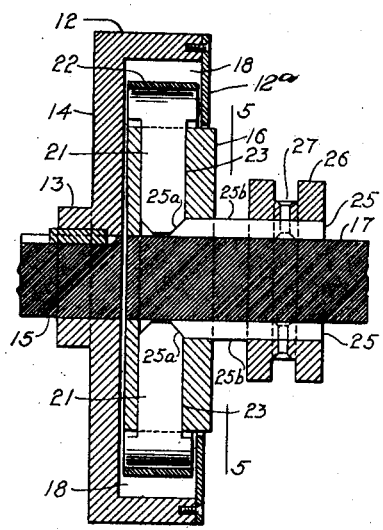
Figure 2 is a section on line 2—2 of Figure 1.
Figure 1:
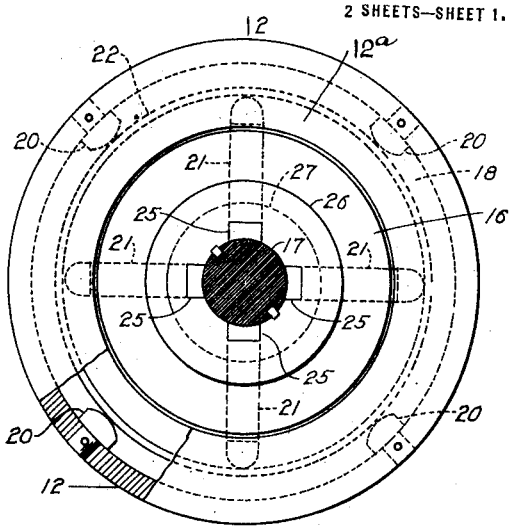
Figure 1 is a side view of a clutch embodying the invention, adapted to connect two alined shafts, one of the shafts being shown in transverse section, and the torque-transmitting means being inoperatively adjusted.

When the members 21 are at the inner extreme of their radial movement, as shown by Figures 1 and 2, they bear loosely on the inner surface of the annular member 22, and support the latter with its outer surface in close proximity to the members 20, as shown by Figure 1, the arrangement being such that a free rotation of the driving body member is permitted without rotation of the other body member. If the inner body member is the driving member, the annular member 22 may rotate with it, the outer body member and the positive members 20 remaining at rest. If, on the other hand, the outer body member is the driving member, the annular member and the inner body member remain at rest. In either case, the annular member 22 may be said to float loosely between the two series of positive members.

Figure 3:
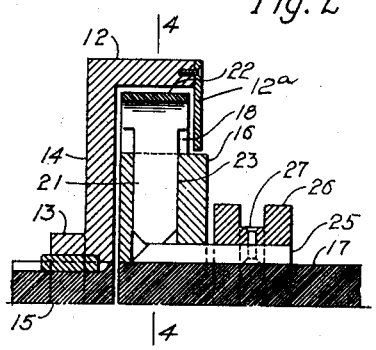
Figure 3 is a view similar to a portion of Figure 2, showing the torque-transmitting means operatively adjusted.
Figure 4:
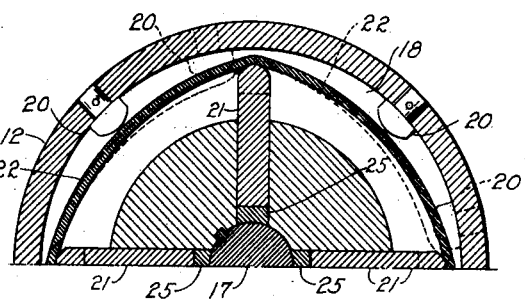
Figure 4 is a section on line 4—4 of Figure 3.

Any suitable means may be provided for moving the members 21 from their inner position shown by Figures 1 and 2, which is their normal and inoperative position, to the operative position shown by Figures 3 and 4. As here shown, the members 21 rest on the beveled ends of wedge bars 25 which are slidable on the shaft 17, by a grooved collar 26 fixed to said wedge bars, and slidable therewith on the shaft 17. The groove 27 in said collar may receive a forked operating lever (not shown) whereby the collar and wedge bars may be moved to the position shown by Figure 3, and thus caused to move the members 21 radially outward.

When the radially movable members 21 are moved outward, they are in interfering relation with the members 20 and exert radial outward pressure on the annular member 22, so that the latter is distorted or flexed, as shown by Figure 4. Portions of the outer surface of the annular member are thus forced into position to abut against the positive members 20. Assuming that the outer body member is the driving member, it will be seen that its positive members 20, in approaching the outwardly moved positive members 21, will first come in contact with the flexed portions of the annular member at a considerable distance from the members 21, and will at first exert a resilient or yielding torque-transmitting pressure on the inner body member through flexible intermediate portions of the annular member, said pressure increasing until the members 20 are so close to the members 21 that the intermediate portions of the annular member 22 are abruptly flexed and constitute practically positive torque-transmitting connections between the members 20 and 21.

The ring 12 may be provided with an inwardly projecting annular flange $12^a$, partly closing the space 18.

In the embodiment of the invention shown by Figures 6 and 7, the outer body member is a pulley which includes a rim 30, having an annular internal face 29, a hub 31, and a web 32 connecting the hub with the rim. The hub is mounted to rotate loosely on a shaft 33, and the inner body member 34 is splined or otherwise rigidly attached to the same shaft. The rim 30 is provided with the positive transmitting members 20, and the inner body member is provided with the positive members 21, these cooperating with the annular member as described in connection with Figures 1 to 5.

It will be seen that the coaxial body members may be of any suitable form and construction, enabling the outer body member to carry a circular series of non-resilient outer torque-transmitting members, such as the members 20, and the inner body member to carry a circular series of non-resilient inner torque-transmitting members, such as the members 21, each series of non-resilient members being concentric with the common axis of the body members, the arrangement being such that either series can normally rotate independently of the other, and that when the members of one series are moved radially from their normal position, the annular resilient torque-transmitting member 22, which is normally substantially concentric with the inner and outer transmitting members, is distorted or flexed, and thus caused to gradually set up a positive connection between one body member and the other.

The means for radially moving the movable transmitting members may be variously modified.

Figures 8, 9 and 10 show an embodiment of the invention in which the non-resilient outer torque-transmitting members are movable relatively to the outer body member, and adapted to flex the resilient annular member, and the non-resilient inner torque-transmitting members are immovable relatively to the inner body member.

The non-resilient inner members are designated $21^a$, and are rigidly secured to the inner body member. The non-resilient outer members are designated $20^a$, and are movable by the grooved collar 26, so that they may occupy the inoperative position shown by Figures 8 and 9, or the operative position shown by Figure 10, to flex the annular member 22, and thus render the clutch operative. The collar 26 as here shown, is slidable on the hub 13, of the outer body member 12, and the members 20ª are fingers fixed to said collar and movable in slots 36 in the web 14. The members 20ª are provided with faces 20ᵇ, inclined relatively to the path of movement of said members, and inner edge faces 20ᶜ parallel with said path.

When the collar 26 is moved from the position shown by Figure 9, to that shown by Figure 10, the faces 20ᵇ act to flex the resilient member 22 inwardly, and the faces 20ᶜ act to maintain the flexure of the resilient member. This action is equivalent to a radial movement of the non-resilient members.

I prefer to call the annular member 22 a resilio-positive member, its action being first resilient, and then positive, so that its cooperation with the non-resilient members first yieldingly, and then positively connects the body members. The members 22 may be composed of resilient wire, and may be formed by assembling and securing together the ends of a plurality of wire lengths to form an annulus, or by helically winding a single length of wire, and securing its convolutions in any suitable way to form an annulus.

It will be seen that in each of the described embodiments of the invention I have provided means for simultaneously flexing the resilio-positive member 22 at a plurality of points, and positively maintaining the flexure. In the embodiments shown by Figures 1 to 7, the bars 25 backed by the shaft 17 (Figure 2), or the shaft 33 (Figure 7), and provided with the inclined end faces 25ª and outer edge faces 25ᵇ, are adapted to move the members 21 to their flexing position and positively hold them in said opsition. In the embodiment shown by Figures 8, 9 and 10, the members 20ª backed by the outer body member 12, and provided with the inclined faces 20ᵇ, and the inner edge faces 20ᶜ, are adapted to flex the resilio-positive member at a plurality of points and positively maintain the flexure.

I claim:

1. A clutch comprising outer and inner body members, and torque-transmitting members, including a resilio-positive annular member, normally floating loosely between the body members, and non-resilient members engaged with the body members, means being provided for moving some of said non-resilient members into interfering relation with the others to flex said annular member and cause said torque-transmitting members to cooperate in first yieldingly and then positively connecting the body members.

2. A clutch comprising outer and inner body members, and torque-transmitting members including a resilio-positive annular member normally floating loosely between the body members, a series of outer non-resilient members engaged with one body member and facing the outer surface of the annular member, and a series of inner non-resilient members engaged with the other body member, and facing the inner surface of the annular member, means being provided for radially moving the non-resilient members of one series into interfering relation with the members of the other series to flex said annular member, and cause all of the torque-transmitting members to cooperate in first yieldingly and then positively connecting the body members.

3. A clutch comprising outer and inner body members, and torque-transmitting members including a resilio-positive annular member normally floating loosely between the body members, a series of outer non-resilient members engaged with one body member and facing the outer surface of the annular member, and a series of inner non-resilient members engaged with the other body member, and facing the inner surface of the annular member, the members of the inner series being radially movable into interfering relation with the members of the outer series, to flex said annular member and cause the torque-transmitting members to first yieldingly, and then positively connect the body members, a series of wedge bars adapted to move the members of the inner series to their flexing position, and to positively hold said members in said position, and means for moving said wedge bars in unison.

In testimony whereof I have affixed my signature.

FRANK A. TURNER.